(12) United States Patent
Herbolzheimer et al.

(10) Patent No.: US 12,246,576 B2
(45) Date of Patent: Mar. 11, 2025

(54) FULLY VARIABLE AND INTEGRAL AERATION FLAP CONTROLLER

(71) Applicant: Bayerische Motoren Werke Aktiengesellschaft, Munich (DE)

(72) Inventors: Robert Herbolzheimer, Groebenzell (DE); Thomas Hoehensteiger, Munich (DE); Andreas Krompass, Simbach am Inn (DE); Stefan Oberberger, Gilching (DE); Michael Wakolbinger, Eschenlohe (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 991 days.

(21) Appl. No.: 17/271,887

(22) PCT Filed: Jul. 2, 2019

(86) PCT No.: PCT/EP2019/067663
§ 371 (c)(1),
(2) Date: Feb. 26, 2021

(87) PCT Pub. No.: WO2020/043364
PCT Pub. Date: Mar. 5, 2020

(65) Prior Publication Data
US 2021/0260960 A1  Aug. 26, 2021

(30) Foreign Application Priority Data
Aug. 28, 2018 (DE) ............ 10 2018 214 550.4

(51) Int. Cl.
*B60H 1/00* (2006.01)
(52) U.S. Cl.
CPC ........ *B60H 1/00871* (2013.01); *B60H 1/004* (2013.01); *B60H 1/00742* (2013.01); *B60H 1/00971* (2013.01)

(58) Field of Classification Search
CPC ............ B60H 1/00871; B60H 1/004; B60H 1/00742; B60H 1/00971; B60H 1/073;
(Continued)

(56) References Cited

U.S. PATENT DOCUMENTS 5,170,935 A * 12/1992 Federspiel ............... F24F 11/63
236/94
2008/0302878 A1  12/2008 Helms
(Continued)

FOREIGN PATENT DOCUMENTS

CN 105189157 A 12/2015
DE 10 2005 048 833 A1 4/2007
(Continued)

OTHER PUBLICATIONS

Frigge, Michael, EP1669226 Translation.df, "Modle based method for controlling a vehicle air conditioning system", Jun. 2006, pp. 1-10.*
(Continued)

*Primary Examiner* — Avinash A Savani
*Assistant Examiner* — Ryan L Faulkner
(74) *Attorney, Agent, or Firm* — Crowell & Moring LLP

(57) ABSTRACT

An aeration flap is automatically controlled in a fully variable manner in a vehicle. A target value is read for a flap position or strength of an airflow of an aeration outlet. A plurality of configurations of aeration flap positions are provided wherein each configuration assigns a resultant noise level and a resultant energy demand for each combination of aeration flap positions. A weighting between noise level and energy demand is specified. Each of the read target values are adapted for a flap position or strength of an airflow according to the specified weighting. The development of noise in the vehicle may be influenced advantageously as a result.

8 Claims, 1 Drawing Sheet

(58) Field of Classification Search
CPC ...... B60H 2001/00733; B60H 1/00735; B60H 1/00814
USPC .......................................................... 454/75
See application file for complete search history.

(56) References Cited

U.S. PATENT DOCUMENTS

| | | | |
|---|---|---|---|
| 2015/0343882 | A1 | 12/2015 | Satzger et al. |
| 2016/0046171 | A1 | 2/2016 | Xia et al. |
| 2017/0369010 | A1* | 12/2017 | Tarte .................... B60W 50/14 |
| 2018/0057013 | A1* | 3/2018 | Mullett .................. B60H 1/267 |
| 2019/0301767 | A1* | 10/2019 | Alexander .............. F24F 13/08 |

FOREIGN PATENT DOCUMENTS

| | | |
|---|---|---|
| DE | 10 2008 017 051 A1 | 10/2009 |
| DE | 10 2016 015 261 A1 | 6/2018 |
| EP | 0 419 722 A1 | 4/1991 |
| EP | 1 236 593 A2 | 9/2002 |
| EP | 1 669 226 A1 | 6/2006 |
| JP | 2007-253884 A | 10/2007 |

OTHER PUBLICATIONS

English translation of Chinese-language Office Action issued in Chinese Application No. 201980046900.0 dated Apr. 28, 2023 (8 pages).

International Search Report (PCT/ISA/210) issued in PCT Application No. PCT/EP2019/067663 dated Oct. 8, 2019 with English translation (four (4) pages).

German-language Written Opinion (PCT/ISA/237) issued in PCT Application No. PCT/EP2019/067663 dated Oct. 8, 2019 (five (5) pages).

German-language Search Report issued in German Application No. 10 2018 214 550.4 dated Feb. 12, 2019 with partial English translation (11 pages).

\* cited by examiner

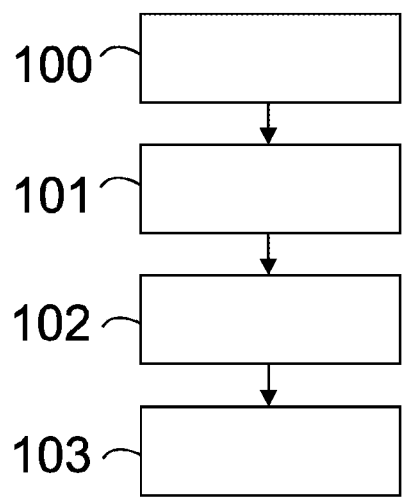

FULLY VARIABLE AND INTEGRAL AERATION FLAP CONTROLLER

BACKGROUND AND SUMMARY OF THE INVENTION

The present subject matter relates to a method for actuating the aeration flap controller. In this way, inter alia, influence can advantageously be taken on the noise generation in the vehicle. Furthermore, the present subject matter relates to a correspondingly configured system arrangement. In addition, a computer program product having control commands is proposed, which implement the method or operate the proposed system arrangement.

EP 1 236 593 A2 discloses an air-conditioning system having a device for regulating the thermal comfort in a motor vehicle having at least one temperature sensor and an outflow unit for directed outflow of air in an outflow region, characterized in that the measurement surface sensed by the temperature sensor approximately corresponds to the air incident flow surface predetermined by the alignment of the outflow unit.

EP 0 419 722 A1 discloses an air-conditioning system for aerating the passenger compartment of a motor vehicle having multiple air outlet openings associated with various seat positions of the vehicle occupants, having associated adjustment elements actuatable via a regulating device for the amount of air and/or the air distribution and/or the air temperature, characterized by a setting dependence of the regulating device on the seat positions of respective associated seat occupancy sensors, in such a way that the air outlet openings associated with the occupied seat positions are fed with a respective passenger-specific airflow and the air outlet openings associated with the unoccupied seat positions are fed with an airflow differing therefrom which is optimum for the passenger compartment in terms of the fastest possible target-actual equalization of the internal temperature.

DE 10 2008 017 051 A1 discloses a method for controlling an air-conditioning system of a vehicle and an operating unit for an air-conditioning system of a vehicle. The air-conditioning system comprises a plurality of separate climate control units. These climate control units are controllable via the operating unit.

According to the prior art, the disadvantage results that the aeration flap control is often not carried out intelligently and predictively, but rather the driver manually sets a configuration which is not optimal. Unnecessary noise pollution can thus occur and the resulting power consumption can be higher than necessary. One example is switching on the ventilation with an essentially closed aeration flap. In general, many aeration flaps are to be adapted to one another, which overburdens the driver in particular while driving.

According to conventional climate control systems, only a locally set climate control (for example by way of the degree of opening of the shutoff flaps at the respective outflow units) takes place at a preset temperature. For this purpose, the driver sets the local amount of air, the climate control direction, and also the temperature and is distracted from driving in the event of a reconfiguration of the climate control, since he has to remove at least one hand from the steering wheel for this purpose. It is often also the case that the driver or a vehicle occupant cannot find a pleasant temperature regulation right away and therefore always has to readjust. The perception of a vehicle occupant also changes over time and an initial cooling or heating is perceived to be unpleasant in the course of time. Moreover, a changed climate control can become necessary due to changes of the external influences, for example the direction and strength of incidence of the solar radiation. It is thus particularly disadvantageous that a vehicle occupant does not always have optimum climate control or is distracted by means of a manual configuration of the air conditioner.

It is an object of the present subject matter to propose an improved method, in particular an integral, noise-optimized, and energy-efficient method, for setting an aeration flap controller. Furthermore, it is an object of the present subject matter to provide a correspondingly configured system arrangement and to propose a computer program product having control commands, which implement the method or at least partially operate the proposed system arrangement.

Accordingly, a method for automatic and fully variable aeration flap control in a vehicle is proposed, characterized by reading out an aeration flap target setting or aeration flap actual setting of each aeration outlet; providing a plurality of configurations of aeration flap settings, wherein each configuration assigns each combination of aeration flap settings a resulting noise level and a resulting power consumption; specifying a weighting between noise level and power consumption; and adapting each of the read-out aeration flap settings as a function of the specified weighting.

The proposed method is used for the automatic and fully variable aeration flap control, wherein the aeration flaps are electronically settable. A target value for the amount of air from the respective aeration flap is read in. This can be specified, for example, by the customer. Furthermore, it is possible to read out the position of the aeration flaps by means of a data interface and process it by means of the method according to the present subject matter. It is therefore proposed that the aeration flap setting of each aeration outlet be read out and the degree of the opening be established accordingly.

While according to conventional methods, the aeration flaps at the respective outflow units of the climate control system are set manually, it is possible according to the present subject matter to actuate them electronically and then set them particularly advantageously. This takes place particularly advantageously because the proposed method regulates all aeration flaps and thus offers an integral concept of the vehicle climate control.

The readout of an aeration flap can take place either directly on a positioning element of the aeration flap or an element influencing it (for example a potentiometer or an incremental encoder) or also by means of a readout of a data memory which stores the corresponding flap settings. Since according to the present subject matter all aeration flaps are read out and taken into consideration, an integral aeration concept is implemented, inter alia, in that the individual air outlets can be adapted to one another and therefore different application scenarios can be served.

Application scenarios are, for example, a particularly low-noise aeration or a particularly energy-saving aeration. However, this is not to be understood as restrictive. Rather, diverse configurations can be offered, which serve freely configurable application scenarios.

To serve the customer wishes, multiple configurations are provided, wherein aeration flap settings are combined with one another empirically and resulting parameters are measured. This can be carried out fully automatically in preparatory method steps. After such a preparation of configurations, it is known which flap settings generate which noise level and have which power consumption. In addition, the cooling power or the aeration power is known. If the driver now selects a specific program of the interior aeration, it is thus possible in a particularly advantageous manner for weighting to take place between a noise level and a power consumption, inter alia. The driver thus requests, for example, a certain temperature at a certain zone in the vehicle interior and it can be established in this case whether the noise level is optimized or the power consumption or in which ratio these parameters are to be taken into consideration. This takes place by means of weighting of the two parameters, so that the respective set value of the aeration flaps meets these requirements.

The weighting between noise level and power consumption can be carried out by the driver himself or the producer supplies corresponding configurations as aeration programs. The weighting or the resulting settings can also be set automatically by the system in such a way that, for example, during preconditioning, i.e. aeration during which the driver is not even present, the noise level is ignored. If the driver wishes to cool down his vehicle in summer before he enters the vehicle, the noise level is thus not relevant, since no persons are located in the vehicle interior. In contrast, if it is an electric automobile, the power consumption is particularly crucial, since the charge level of the battery has a direct effect on the range of the vehicle. The power consumption is thus to be weighted higher here. If the battery of an electric automobile is nearly discharged, the power consumption is thus weighted higher and possibly a higher noise level is tolerated.

The configurations provide all possible flap settings for this purpose and prevent, for example, the air conditioner from blowing against an (even partially) closed flap. In addition, it is possible to open only individual air outlets and close further ones. It can thus be particularly preferable to aerate only the middle of a vehicle or only the sides. This can be set on the basis of predefined programs.

As soon as the weighting has been selected, according to the present subject matter the setting of the aeration flaps is performed accordingly. It is thus generally advantageous that corresponding to the setting of the user, the configuration is also selected which supplies the desired aeration powers as a function of the noise level and the power consumption. The proposed method is applied iteratively, so that an adaptation of the settings is possible at any time.

The individual setting at throttles of the individual outlets can be reactivated depending on the occupants (for example via a key detection and/or an occupant detection or the like), for example if another driver having other settings has driven in the meantime.

Since the position of the shutoff is known, in contrast to the case of a mechanical knurl, this information can have influence on the air distribution regulation according to one aspect of the present subject matter. This can reduce noises, since the air can be distributed better and only the required amount of air is conveyed to the outlets. Therefore, no air discharge or blowing takes place against the closed grill.

The amount of air can be varied between aeration in the middle and aeration laterally, for example as a function of the blowing-out temperature. In the case of warm air, according to one aspect of the present subject matter, aeration takes place more on the outside on the cold doors and windows, and in the case of cooling, aeration takes place more in the middle.

The amount of air can be varied between aeration in the middle and aeration laterally to the driver. A division of the aeration into indirect aeration, aeration in the middle, and/or aeration laterally thus takes place, for example, depending on a solar influence. The solar flux gives an indication of the solar radiation and is measured, for example, via the windshield, the side window, and/or the sunroof. The amount of air can be distributed fully variably between left and right side in the vehicle and between aeration outlets arranged on the outside and in the middle. An optimization of the climate style and/or a control of the amount of air per zone can thus take place. A pre-conditioning of the vehicle can be made more efficient, since all outflow units in the cockpit can be opened automatically.

Irregularities within the air conditioner and the air ducts can be compensated for. The nonlinearities of the flow resistance of ducts and air conditioner with different amounts of air can also be compensated for. Furthermore, there are new options for air regulation for innovative individual climate experiences in the vehicle, for example targeted "blowing" depending on the precise position of the occupant. In the energy-saving mode, air distribution and amounts of air can be adapted better to the reduced consumption.

The information about the degree of opening enables an adaptation of the control to temperature probes which have poor incident flow, for example. Thus, for example, only temperature probes having incident flow can be taken into consideration according to the present subject matter and it is possible to correct for temperature probes having poor incident flow.

In the following, aspects are partially described with reference to electrically driven vehicles, which is not to be interpreted as restrictive, however. Rather, the present subject matter is generally oriented both to electric vehicles and also to vehicles having internal combustion engines. Motor vehicles are thus refined in general according to the present subject matter. In general, any motor vehicle comes into consideration as a motor vehicle here, in particular an automobile. The present subject matter may be used particularly advantageously in motor vehicles having hybrid drive.

According to one aspect of the present subject matter, the aeration flap settings are electrically settable. This has the advantage that the aeration flap settings can be performed automatically and the respective flap setting can also be read out automatically. A fully automatic method is therefore proposed, which enables the driver not to be distracted by the configuration of the aeration flaps.

According to a further aspect of the present subject matter, the plurality of configurations is provided by means of a data memory. This has the advantage that the producer can ascertain corresponding configurations empirically and can then save the configurations in a data memory. In general, it is also possible to use the data memory by means of an air interface and to also offer the configurations in the field. Already stored configurations can thus also be updated or expanded.

According to a further aspect of the present subject matter, the plurality of configurations is empirically ascertained. This has the advantage that under specific conditions, the configurations can be created and the noise level and the power consumption can be measured as a function of the desired cooling power or aeration power. Thus, for example, the driver can specify certain zones to which an airflow is particularly to be applied. For this purpose, the noise level and the power consumption are measured and a configuration can be created which provides the aeration power and nonetheless serves different weightings of noise level and power consumption. A flap can thus indirectly aerate a specific region, which results in a lower noise level but an increased power consumption. If a zone is acted on directly by means of an airflow, the noise level can be higher but the power consumption is lower, since the flap can be opened further.

According to a further aspect of the present subject matter, the configurations differ between a direct aeration, a central aeration, and/or a lateral aeration. This has the advantage that all aeration scenarios can be served and different directions of the aeration can be tested out. These configurations are then stored and applied in the respective situation.

According to a further aspect of the present subject matter, the weighting is provided by the user and/or specified by a provided regulating mechanism. This has the advantage that any weightings are possible which the user either specifies while driving or the producer creates a regulating mechanism which specifies, for example, that in the event of an absence of persons in vehicles, the noise level is to be ignored. A seat occupancy can also be read out and then the seats which are not occupied can then be subjected to a higher noise level.

According to a further aspect of the present subject matter, if no occupants are located in the vehicle, the noise level can be set to be ignored in the weighting. This has the advantage that initial cooling down or flushing of the vehicle interior can take place at full power, even if the noise level increases. Since a particularly strong airflow can be generated for this purpose, the power consumption is possibly higher.

According to a further aspect of the present subject matter, the power consumption is weighted as a function of a charge level of a battery. This has the advantage that at a low charge level of the battery, the power consumption can be weighted higher and possibly the noise level is also to be neglected. This has a direct effect on the range of the vehicle in the case of electric mobility.

The object is also achieved by a system arrangement for automatic and fully variable aeration flap control in a vehicle, characterized by an interface unit configured for reading out an aeration flap setting of each aeration outlet, a data memory configured for providing a plurality of configurations of aeration flap settings, wherein each configuration assigns each combination of aeration flap settings a resulting noise level and a resulting power consumption; a further interface unit configured for specifying a weighting between noise level and power consumption; and at least one control unit configured for adapting each of the read-out aeration flap settings as a function of the specified weighting.

The object is also achieved by a computer program product having control commands which execute the method and operate the proposed arrangement when they are executed on a computer.

It is particularly advantageous according to the present subject matter that the method can be used for operating the proposed devices and units or the system arrangement. Furthermore, the proposed devices and units are suitable for executing the method according to the present subject matter. The proposed devices and units may be implemented in hardware as electronic circuits, software components achieved via instructions embodied in a non-transitory computer-readable medium and executed by a processor, or a combination of both. Therefore, in each case the device implements structural features which are capable of executing the corresponding method. The structural features can also be embodied as method steps, however. The proposed method also provides steps for implementing the function of the structural features.

Further advantages, features, and details of the present subject matter result from the following description, in which aspects of the present subject matter are described in detail with reference to the drawings. The features mentioned in the claims and in the description can each be essential to the present subject matter individually as such or in any combination. The above-mentioned features and the features listed hereinafter can also each be used as such or in multiples in any combinations. The embodiments shown and described are not to be understood as exhaustive, but rather have example character for explaining the present subject matter. The detailed description is used to inform a person skilled in the art, therefore known circuits, structures, and methods are not shown or explained in detail in the description, so as not to make it more difficult to comprehend the present description.

BRIEF DESCRIPTION OF THE DRAWING

FIG. 1 shows a schematic flow chart of a method for automatic and fully variable aeration flap control according to one aspect of the present subject matter.

DETAILED DESCRIPTION OF THE DRAWING

FIG. 1 shows a schematic flow chart of a method for automatic and fully variable aeration flap control in a vehicle, characterized by reading out 100 an aeration flap setting of each aeration outlet; providing 101 a plurality of configurations of aeration flap settings, wherein each configuration assigns each combination of aeration flap settings a resulting noise level and a resulting power consumption; specifying 102 weighting between noise level and power consumption; and adapting each of the read-out 103 aeration flap settings as a function of the specified 102 weighting.

FIG. 1 shows, according to a further aspect, a method for automatic and fully variable aeration flap control in a vehicle, characterized by reading out 100 a target value for a flap setting or strength of an airflow of each aeration outlet, providing 101 a plurality of configurations of aeration flap settings, wherein each configuration assigns each combination of aeration flap settings a resulting noise level and a resulting power consumption, specifying 102 a weighting between noise level and power consumption and adapting each of the read-out 103 target values for the respective flap setting or strength of the respective airflow as a function of the specified 102 weighting.

Furthermore, a system arrangement for automatic and fully variable aeration flap control in a vehicle is proposed, characterized by an interface unit configured for reading out 100 a target value for a flap setting or strength of an airflow of each aeration outlet, a data memory configured for providing 101 a plurality of configurations of aeration flap settings, wherein each configuration assigns each combination of aeration flap settings a resulting noise level and a resulting power consumption, a further interface unit configured for specifying 102 a weighting between noise level and power consumption, and at least one electronic control unit configured for adapting each of the read-out 103 target values for the respective flap setting or strength of the respective airflow as a function of the specified 102 weighting.

According to a further aspect of the present subject matter, the adaptation takes place iteratively and the climate control direction and/or the climate control temperature is adapted in each iteration. This has the advantage that the climate control can follow the movements of the occupants and can also adapt the temperature control over a time period.

The occupant will also become adapted over time by means of the climate control to his desired temperature or to a preset or individually configured target temperature and therefore the climate control can be throttled. Contrary to this scenario, upon entry, the driver can always be subjected to maximum climate control in order to thus adapt him as efficiently as possible to the target temperature.

A person skilled in the art recognizes here that the steps can have further sub-steps and in particular the method steps can each be executed iteratively and/or in another sequence. Thus, the steps of reading out 100 an aeration flap setting, providing 101 a plurality of configurations, and/or specifying 102 a weighting can be executed in parallel.

A data memory or a non-transitory computer-readable medium having a computer program product having control commands which implement the proposed method or operate the proposed system arrangement when they are executed on a computer is not shown in the present case.

What is claimed is:

1. A system for automatic and fully variable aeration flap control in a vehicle, comprising:
    a first interface configured to read out a target value for an aeration flap setting or strength of an airflow of an aeration outlet;
    a data memory configured to provide a plurality of configurations of aeration flap settings, wherein out of the plurality of configurations of aeration flap settings, each configuration assigns each combination of aeration flap settings a resulting noise level and a resulting power consumption;
    a second interface configured to specify a weighting between noise level and power consumption; and
    a control unit configured to adapt each of the target values for the respective aeration flap setting or strength of the respective airflow as a function of the specified weighting, wherein
        the specified weighting is associated with a determination of which of the power consumption or the noise level is more tolerated.

2. The system according to claim 1, wherein the aeration flap settings are electrically settable.

3. The system according to claim 1, wherein the plurality of configurations are empirically ascertained.

4. The system according to claim 1, wherein the configurations differentiate between direct aeration, a central aeration, and/or a lateral aeration.

5. The system according to claim 1, wherein the weighting is provided by a user and/or is specified by a regulator.

6. The system according to claim 1, wherein when no occupants are located in the vehicle, the noise level is set to be ignorable in the weighting.

7. The system according to claim 1, wherein the power consumption is weighted as a function of a charge level of a battery.

8. The system according to claim 1, wherein the weighting is a ratio between the noise level and the power consumption.

* * * * *